Sept. 27, 1955 J. BOLSEY 2,718,832
PHOTOGRAPHIC REFLEX CAMERAS
Filed June 8, 1950 2 Sheets-Sheet 1
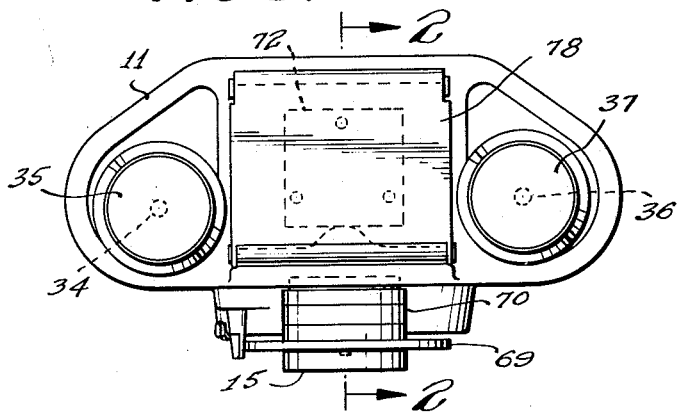
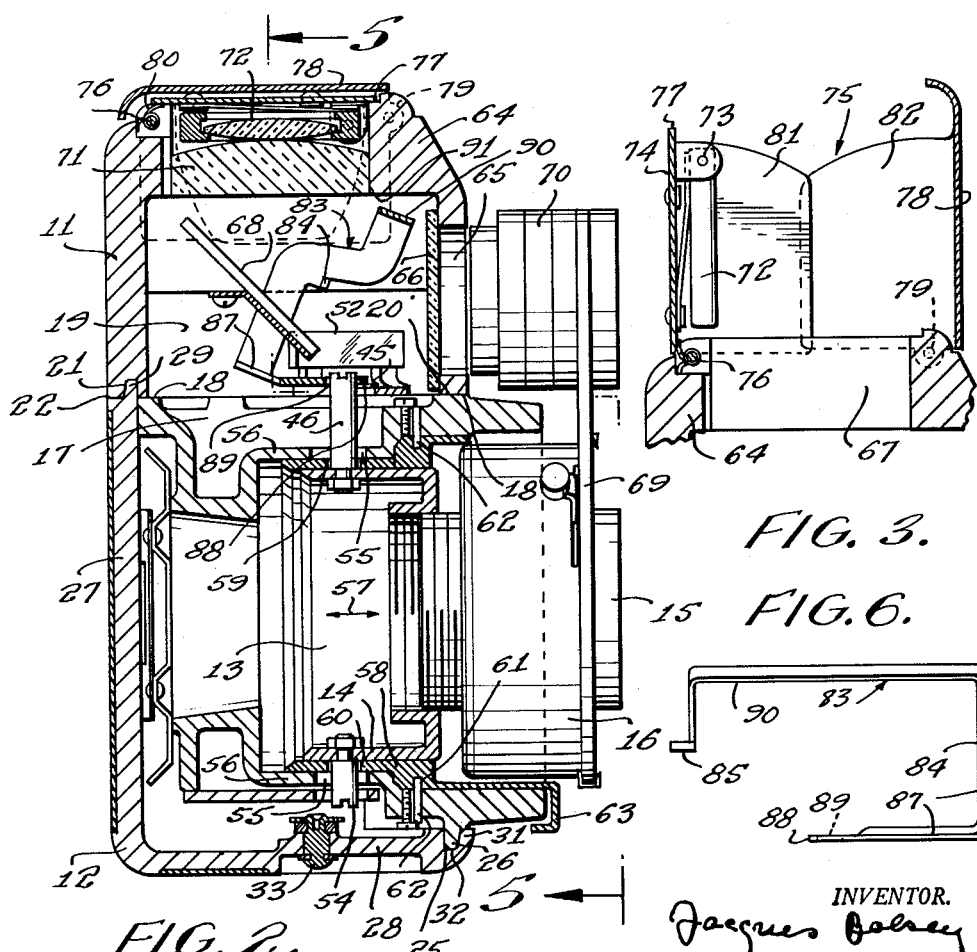
INVENTOR.
Jacques Bolsey
BY Sept. 27, 1955   J. BOLSEY   2,718,832
PHOTOGRAPHIC REFLEX CAMERAS
Filed June 8, 1950   2 Sheets-Sheet 2

INVENTOR.
Jacques Bolsey
BY
Michael S. Striker

United States Patent Office

2,718,832
Patented Sept. 27, 1955

---

2,718,832

PHOTOGRAPHIC REFLEX CAMERAS

Jacques Bolsey, New York, N. Y.

Application June 8, 1950, Serial No. 166,927

1 Claim. (Cl. 95—44)

My present invention relates to photographic cameras, and more particularly to twin lens photographic reflex cameras.

It is an object of my present invention to provide a photographic reflex camera of the above type which is easy to manufacture and simple to use and nevertheless adapted for taking pictures of high quality.

It is a further object of my present invention to provide a reflex camera in which the reflex lens is arranged and connected to the objective lens in a novel manner ensuring simultaneous equal movement of these lenses.

It is another object of my present invention to provide in a reflex camera of the above type a light excluding hood arrangement which consists of very few parts and is constructed so as to eliminate the necessity for catch means or the like to keep the hood in closed position.

With the above objects in view, my present invention mainly relates to twin lens photographic reflex cameras and consists in the combination of a camera body, an objective lens unit arranged slidably in this camera body in direction of the optical axis of the camera, a reflex view finder arrangement arranged also in the camera body and including an entrance opening in the front wall of the camera body, and a reflex lens carried by the objective lens unit together with the same and arranged so as to be located in front of the entrance opening in the front wall of the camera body.

In a preferred embodiment of my present invention, the reflex view finder arrangement includes a compartment in the upper part of the camera body provided with an observation opening at its top and a reflex mirror arranged within this compartment so as to be adapted to reflect light rays entering through the entrance opening into the above mentioned observation opening.

A particularly preferred focusing arrangement according to my present invention includes a camera body, an objective lens barrel arranged slidably in the camera body in direction of the optical axis of the camera, an objective lens secured to the front end of the objective lens barrel, a shutter mechanism secured also to the front end of the objective lens barrel; a reflex view finder arrangement arranged in the camera body and including an entrance opening in the front wall of the camera body, a reflex lens carried by the objective lens barrel at the front end thereof spaced from the barrel so as to be located in front of the entrance opening in the front wall of the camera body, a range finder arrangement located also in the camera body and including a range finder member to be moved in accordance with the position of the objective lens, operating means mounted on the objective lens barrel and engaging the range finder member so as to move it during its sliding in direction of the optical axis of the camera, and means for sliding the objective lens barrel together with the reflex lens, the shutter mechanism and the operating means so as to simultaneously adjust the position of the reflex lens and operate the range finder arrangement.

I have found it advisable to equip a photographic reflex camera of the above type with a foldable light excluding hood composed of a first hood member pivoted along one edge to the camera body along one edge of the observation opening and reaching in closed position with its opposite end to the opposite edge of the observation opening, and a second hood member pivoted along one edge to the camera body along the opposite edge of the observation opening and adapted to lie in closed position superimposed upon the first hood member holding the same also in closed position.

The novel features which I consider as characteristic for my invention are set forth in particular in the appended claim. The invention itself, however, both as to its construction and its method of operation, together with additional objects and advantages thereof, will be best understood from the following description of specific embodiments when read in connection with the accompanying drawings, in which:

Fig. 1 is a top view of a twin lens photographic reflex camera according to my present invention;

Fig. 2 is a vertical section through the camera shown in Fig. 1 along line 2—2 of that figure;

Fig. 3 is an enlarged cross section through the hood arrangement with the hood members in open position;

Fig. 6 is a side view of the parallax correcting means forming part of my new camera.

Figure 4:
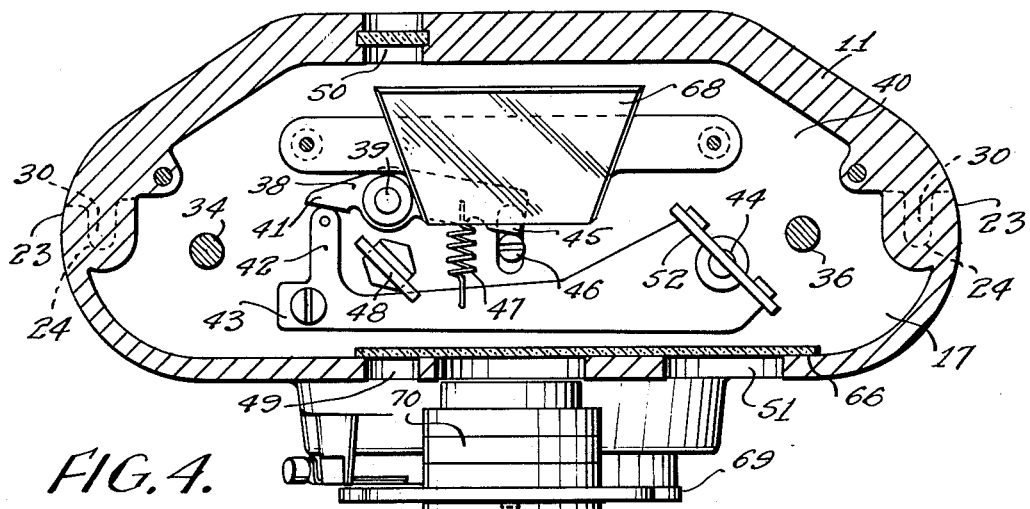
Fig. 4 is a horizontal section through the camera shown in Figs. 1 and 2, taken along line 4—4 of Fig. 5.

My new camera contains as main elements a camera housing composed of the main camera body 10 on top of which the camera top 11 is mounted. The housing is completed and closed during use by the camera cover 12 constructed as shown and as clearly described in my copending U. S. patent application Serial No. 779,301, filed October 11, 1947, and entitled "Photographic Cameras," now Patent No. 2,508,095.

The camera body 10 is provided as shown in Fig. 2, with a central cylindrical compartment 13 into which fits the lens barrel 14 carrying in usual manner the lens 15 and the shutter mechanism 16.

This camera body 10 is provided, as shown in Figs. 2 and 4, at its top with a compartment 17 surrounded by the flat rim 18. Furthermore, the camera body 10 is provided along its two lateral vertically extending edges 23 with U-shaped grooves 24 as shown in Fig. 4. Finally, the camera body is also provided along its bottom edge with a longitudinal projection 26 as shown in Fig. 2.

The top member 11 mentioned above contains the compartment 19 forming together with the compartment 17 in the camera body 10 a large combined compartment. Furthermore, the top member of the camera is provided along its front edge with a flat rim 20 having the same shape as the front portion of rim 18 and adapted to fit on the same. Along the rear edge of the top member 11 a U-shaped groove 21 is provided in the rim 22 of the same; this rim 22 is, as clearly shown in Fig. 2, arranged so as to project rearwardly beyond the rear edge of rim 18 of the camera body 10.

The cover 12 is composed of a rear cover portion 27 and a bottom cover portion 28. The rear cover portion 27 is provided along its top edge with a longitudinal projection 29 adapted to fit into the corresponding U-shaped groove 21 of the top member 11, as clearly shown in Fig. 3. Furthermore, the rear cover portion 27 of the cover member 11 is provided along its lateral vertically extending edges with two longitudinal projections 30 adapted to fit into the corresponding U-shaped grooves 24 provided along the lateral edges 23 of the camera body 10, as clearly shown in Fig. 2. Finally, the bottom portion 28 of the cover 12 is provided along its front edge 31 with a U-shaped groove 32 into which fits the longitudinal projection 26 arranged along the bottom edge 25 of the camera body 10, as clearly shown in Fig. 2.

The camera cover 12 is secured to the camera in proper operative position covering the rear and bottom of the camera body 10 by means of a turnable closure mechanism 33 of conventional type, whenever desired.

The camera body itself is provided not only with a cylindrical compartment 13 but also with two film compartments, not shown in the drawings, which are arranged on both sides of compartment 13. One of these film compartments contains a film spool from which the film strip is unwound, and the other of the compartments contains the take-up spool upon which the film strip is wound during its transportation. The film spool mentioned above is secured to shaft 34 which can be turned by winding knob 35 while the take-up spool is connected with shaft 36 which can be turned by the rewind knob 37.

In view of the fact that the means for transporting the film do not form part of the present invention and can be of any conventional type, they are not shown in the drawing and their detailed description seems to be unnecessary.

My new camera is equipped with a range finder unit arranged in the combined compartments 17 and 19. It includes the flat lever 38 pivoted by means of pivot 39 to the partition wall 40 forming the bottom of the combined compartment mentioned above. This lever 38 is provided with a lever arm 41 engaging the corresponding lever arm 42 of the double armed lever 43 pivoted at 44 also to the partition wall 40. The other arm 45 of the double armed lever 43 abuts against the operating pin 46 secured to the lens barrel 14, as shown in Fig. 2, and moving together with this lens barrel in axial direction, i. e. in direction of the optical axis of the camera.

The spring 47 forces the lever arm 45 of lever 43 to permanently follow pin 46 and furthermore compels the lever arm 41 of lever 38 to press permanently against the lever arm 42 of the lever 43.

The stationary mirror 48 forming part of the range finder unit described above, is directly secured to the partition wall 40 and arranged partly in the path of the light rays passing through the entrance hole 49 and observation hole 50 of the range finder.

The entrance hole 51 for the light rays impinging upon the turnable mirror 52 mounted on lever 43 is arranged in the front wall of the camera, as clearly shown in Fig. 4.

This range finder arrangement, although of simple construction, operates reliably as described in detail in my copending U. S. patent application Serial No. 52,930, filed October 5, 1948, and entitled "Range Finder", now U. S. Patent 2,689,509, issued Sept. 21, 1954.

In order to operate this range finder, the lens barrel 14 is provided with two radially extending pins 46 and 54. Pin 46 is relatively long and engages, as set forth above and clearly shown in Fig. 2, the lever arm 45 of lever 38 forming part of the range finder arrangement described above.

The pins 46 and 54 are passing through and are guided by longitudinal slots 55 provided in the cylindrical portion 56 of the camera body 10 surrounding the lens barrel 14. Thus, the lens barrel 14 is prevented from turning but able to slide in direction of the optical axis of the camera as indicated by arrow 57.

Between the inner cylindrical surface of the cylindrical body portion 56 and the lens barrel 14, I arrange a cylindrical guiding sleeve 58 provided with two helical slots 59 and 60 through which are passing the pins 46 and 54, respectively. This cylindrical guiding sleeve 58 is provided with an annular slot 61 into which project the guide plates 62 secured to the camera body 10. These guide plates 62 prevent movement of the cylindrical guiding sleeve 58 in axial direction as indicated by arrow 57, while permitting its turning about the optical axis of the lens.

At the front edge of the cylindrical guiding sleeve 58 described above, I provide a focusing lever 63. By turning of this focusing lever 63 it is possible to turn the guiding sleeve 58. Such turning movement of the guiding sleeve 58 will be transmitted by means of the helical slots 59 and 60 and pins 46 and 54 to the lens barrel 14, resulting in sliding of the same in axial direction. During such sliding movement of the lens barrel 14, the pin 46 secured thereto will operate the range finder as described above.

The camera top 11 forms not only the general compartment 19, but is in addition thereto provided with an upward projecting rectangular shaft-shaped extension 64 housing part of my new reflex view finder arrangement described below in detail. This view finder arrangement, which serves also for focusing purposes, includes the central entrance opening 65 arranged in the front wall of the camera top 11. This opening 65 is closed from its inner side in the same manner as the holes 49 and 51 by a continuous glass plate 66 arranged as shown in Fig. 4.

Figure 5:
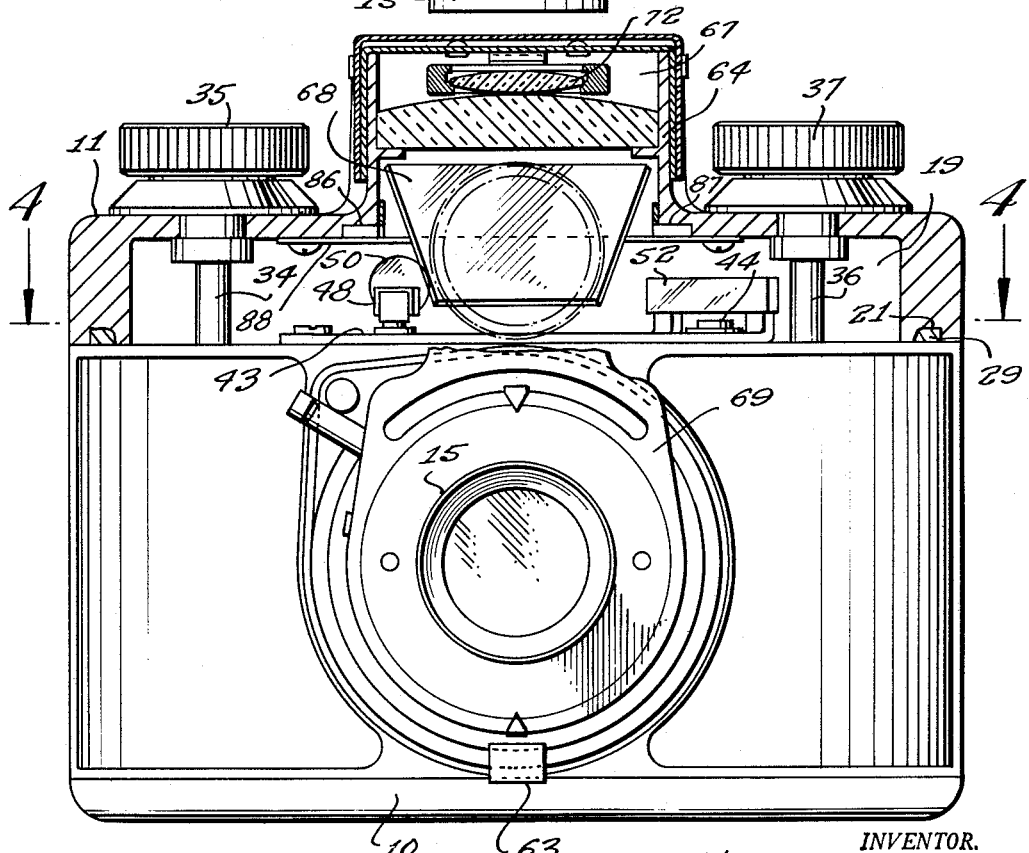
Fig. 5 is a longitudinal section through the camera shown in Figs. 1 to 4, along line 5—5 of Fig. 2.

Extension 64 is open at its top forming, as shown in Figs. 2, 3, and 5, an observation opening 67.

Within the compartment 19 formed in the camera top 11, an inclined mirror 68 is arranged so as to reflect the light rays entering through the entrance opening 65 into the observation opening 67.

In accordance with my present invention, I secure—as clearly shown in Figs. 2, 4, and 5—a supporting plate 69 to the front end of the lens barrel 14. This supporting plate 69 extends in upward direction and carries at its top end the reflex lens 70 which extends in rearward direction partly reaching into the entrance opening 65, as clearly shown in Fig. 2.

It should be stressed that the reflex lens 70 is carried only and exclusively by the supporting plate 69 which in turn is carried only and exclusively by the lens barrel 14 directly secured to the same or to the shutter mechanism or objective lens attached to the lens barrel at the front end thereof.

The reflex lens 70 cooperates for focusing purposes with the reflex mirror 68 in well known manner, and the curved ground glass 71 arranged within extension 64.

The reflex picture appears in well known manner on the ground glass 71 and can be observed through the observation opening 67 either directly or through the magnifying lens 72 which is tiltably secured at 73 to the inner hood member 74 of the hood 75 serving for closing the observation opening 67 of the reflex view finder.

The inner hood member 74 is pivoted at 76 to the camera top 11 and shaped in accordance with the present invention so that its front edge 77 reaches to the front edge of the observation opening 67.

The outer hood member 78 of the hood 75 is pivoted at 79 to the camera top and can be turned over the inner hood member 74, as shown in Fig. 2.

I have found that by extending the front edge 77 of the inner hood member 74 near to the pivoting means 79 for the outer hood member 78, it is possible to prevent unintentional opening of the hood members by spring 80 acting upon the hood member 74, even without provision of separate catch means for holding the outer hood member 78 in closed position.

The hood members 74 and 78 are provided with side members 81 and 82, respectively, arranged as shown in Figs. 3 and 5, and cooperating with each other so that the hood members form in open position a shaft extension having a rectangular cross section.

The new parallax correcting and indicating means proposed by me are shown in Figures 2, 5 and 6. They consist of a yoke-shaped member 83 provided at its ends with pivots 84 and 85. These pivots engage holes 86 and 87, respectively, which are provided in the top wall of the camera top member 11. The pivots 84 and 85 are held in these holes by plate 86 as clearly shown in Figure 5.

The parallax correcting yoke-shaped member 83 is provided with an operating extension 87 arranged as clearly shown in Figure 2. This operating extension is provided at its free end 88 with a hole 89 into which the pin 46 projects.

Thereby, movement of the pin in direction of arrow 57 will result in turning of the parallax correcting yoke 83 about the pivots 84 and 85.

As clearly shown, the upper yoke portion 90 is arranged so as to be located substantially under the front edge 91 of the ground glass 71.

Consequently, movement of the pin 46 in forward direction will result in turning of the yoke portion 90 backward, covering a strip-shaped portion of the ground glass 71 along the front edge 91 thereof. This will occur when the lens barrel 14 together with lens 15 is moved outward for focusing and taking pictures of closed objects.

It will be understood that each of the elements described above, or two or more together, may also find a useful application in cameras of other types, differing from the types described above.

While I have illustrated and described the invention as embodied in reflex cameras, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claim.

What I claim as new and desire to secure by Letters Patents is:

In a twin lens photographic reflex camera, in combination, a camera body having a front wall and an intermediate wall extending rearwardly from said front wall, said front wall being formed with an upper opening located above said intermediate wall and with a lower opening located beneath said upper opening and below said intermediate wall, and said intermediate wall being formed with an elongated slot parallel to and located over the optical axis of the camera; a reflex view finder arrangement located in said camera body above said intermediate wall and behind said front wall thereof; a cylindrical guiding sleeve arranged in said camera body non-slidably but only turnably about its axis which coincides with the optical axis of the camera, said guiding sleeve being formed with a helical groove; an objective lens barrel arranged non-turnably but only slidably in said cylindrical guiding sleeve slidably in the axial direction of the same and projecting forwardly through said lower opening beyond said front wall of said camera body; a pin fixed to said objective lens barrel and projecting through said helical groove of said guiding sleeve and through said slot of said intermediate wall to the space located above said intermediate wall; an objective lens secured to the front end of said objective lens barrel; holding means secured also to the front end of said objective lens barrel carried and supported exclusively by the same and extending in a plane substantially parallel to and spaced forwardly of said front wall of said camera body; a reflex lens secured to said holding means and located in front of said camera body in line with said upper opening of said front wall and extending rearwardly toward and reaching into said upper opening; focusing means mounted in said camera body directly engaging said cylindrical guiding sleeve for turning the latter to slide said objective lens barrel in the direction of the optical axis of the camera together with said objective lens, said holding means, and said reflex lens carried by said lens barrel; and one-piece parallax correcting means turnably mounted in said camera body over said intermediate wall thereof for movement about an axis located over and being substantially perpendicular to the optical axis of the camera, said parallax correcting means operatively engaging said pin at a portion thereof located above said intermediate wall so that said parallax correcting means will be automatically turned upon movement of said lens barrel along the optical axis of the camera.

References Cited in the file of this patent

UNITED STATES PATENTS

| | | |
|---|---|---|
| 834,089 | Wallace | Oct. 23, 1906 |
| 1,273,373 | Iwagami | July 23, 1918 |
| 1,760,827 | Goldhammer | May 27, 1930 |
| 2,048,773 | Baumgartner | July 28, 1936 |
| 2,153,813 | Pritschow | Apr. 11, 1939 |
| 2,165,402 | Mihalyi | July 11, 1939 |
| 2,294,445 | Bressler | Sept. 1, 1942 |
| 2,305,665 | Bolsey | Dec. 22, 1942 |
| 2,309,403 | Kosken et al. | Jan. 26, 1943 |
| 2,358,121 | Wittel | Sept. 12, 1944 |
| 2,407,917 | Bolsey | Sept. 17, 1946 |
| 2,495,355 | Stahl | Jan. 24, 1950 |
| 2,496,059 | McIlroy | Jan. 31, 1950 |
| 2,500,050 | Brundage | Mar. 7, 1950 |

FOREIGN PATENTS

| | | |
|---|---|---|
| 526,340 | Germany | June 5, 1931 |
| 765,541 | France | Mar. 26, 1934 |
| 139,655 | Austria | Dec. 10, 1934 |